United States Patent [19]

Goldowsky

[11] Patent Number: 4,473,259
[45] Date of Patent: Sep. 25, 1984

[54] LINEAR MAGNETIC BEARINGS

[75] Inventor: Michael P. Goldowsky, Valhalla, N.Y.

[73] Assignee: The United States of America as represented by the Administrator of the National Aeronautics and Space Administration, Washington, D.C.

[21] Appl. No.: 415,960

[22] Filed: Sep. 8, 1982

Related U.S. Application Data

[63] Continuation-in-part of Ser. No. 220,213, Dec. 24, 1980, abandoned.

[51] Int. Cl.$^3$ ............................................. F16C 39/06
[52] U.S. Cl. ................................... 308/10; 104/281; 104/284
[58] Field of Search .................. 308/10; 310/12, 13, 310/14, 23; 104/281, 282, 284, 292

[56] References Cited

U.S. PATENT DOCUMENTS

| 396,792 | 1/1889 | Williams | 104/292 |
|---|---|---|---|
| 1,020,942 | 3/1912 | Bachelet | 104/282 |
| 3,702,208 | 11/1972 | Habermann | 308/10 |
| 3,707,924 | 1/1973 | Barthalon | 310/12 |
| 4,012,083 | 3/1977 | Habermann | 308/10 |
| 4,180,946 | 1/1980 | Heijkenskjold | 308/10 |

*Primary Examiner*—R. Skudy

[57] ABSTRACT

A magnetic bearing for supporting in suspension a linear armature member (20) includes an elongated cylindrical housing (18) having two sets of U-shaped stationary electromagnets ($10_1$, $12_1$, $14_1$, $16_1$ and $10_2$, $12_2$, $14_2$, $16_2$) and position sensors ($48_1$, $50_1$ and $48_2$, $50_2$) respectively located at each end of the housing (18). Each set of electromagnets preferably consists of four electromagnet assemblies (10, 12, 14, 16) located 90° apart around the periphery of the housing (18) and are operable to generate four orthogonal magnetic fields (30) within the housing (18). Each set of position sensors (48, 50) are aligned with the electromagnets (10 and 12) to define two orthogonal horizontal (X) and vertical (Y) axes from which signals proportional to orthogonal shaft displacement are provided. These signals are fed to four separate circuit means (126, 132, 138, 140, 150), two for each X and Y axis which are adapted to provide signals proportional to shaft positional displacement and velocity within the housing which are utilized to generate respective control signals of the proper amplitude and direction to energize the coil windings ($32_1$, $34_1$, $36_1$, $38_1$ and $32_2$, $34_2$, $36_2$, $38_2$) for radially centering the shaft (20) within the housing (18) while maintaining a predetermined stiffness and dampening characteristic. The armature 20 is composed of a magnetic material, at least in the vicinity of the two sets of electromagnets and sufficiently beyond, so as to provide support for the armature throughout its distance of linear, axial travel. The remainder of the armature may be reduced in diameter or of lightweight material. A bumper magnet assembly (106), comprising an axially magnetized magnet (108) situated between a pair of magnets (112, 114), is included for positioning, axially moving or dampening axial displacement of the armature member (20).

23 Claims, 9 Drawing Figures

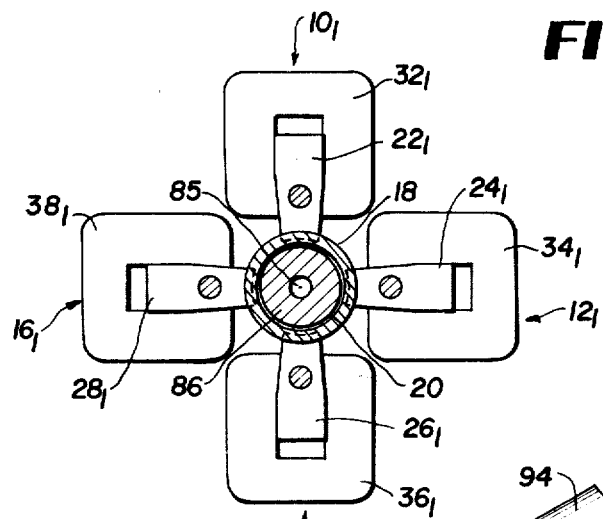
FIG.3
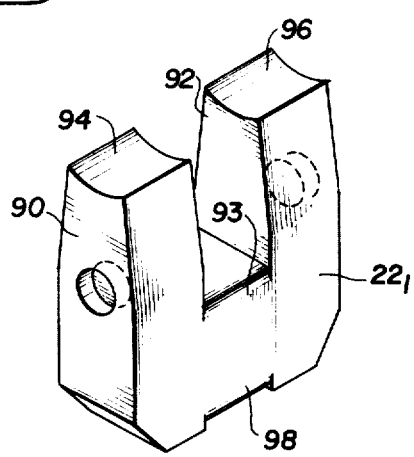
FIG.4
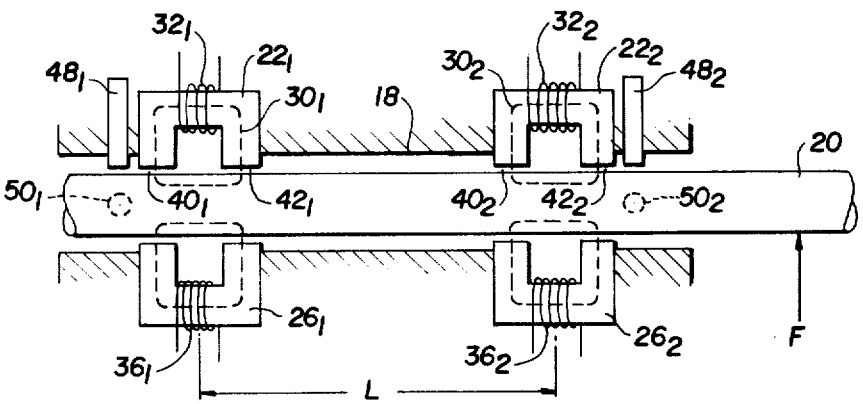
FIG.6
FIG.5

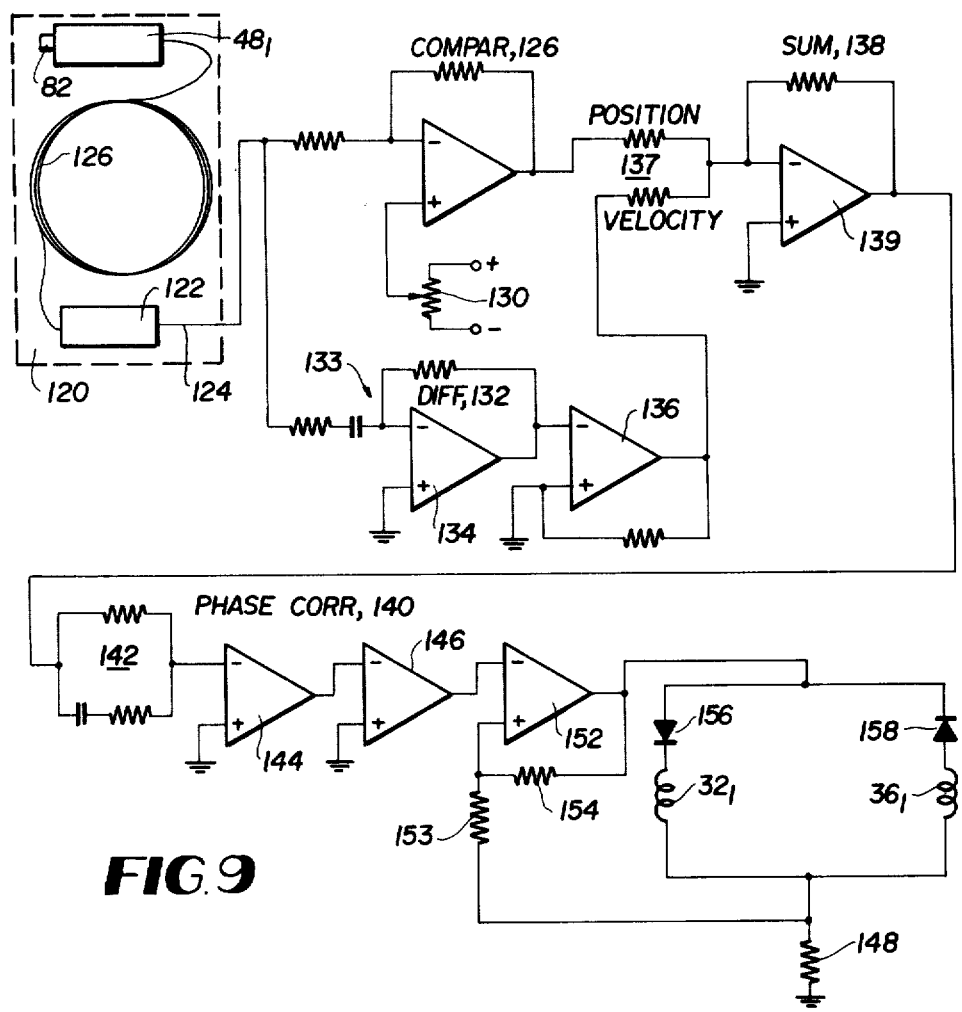
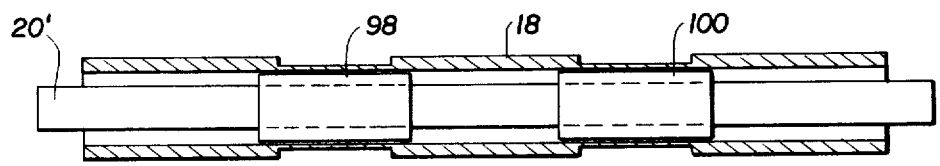
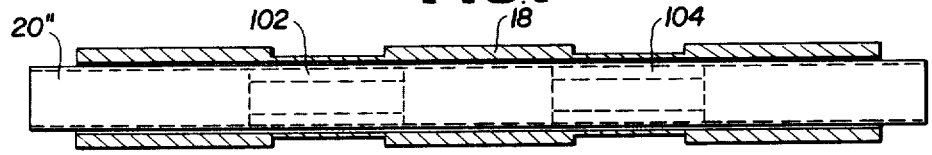

4,473,259

1

LINEAR MAGNETIC BEARINGS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This is a continuation-in-part application of U.S. patent application Ser. No. 220,213 filed on Dec. 24, 1980, now abandoned, and is entitled to the benefits bestowed by 35 U.S.C. 120.

TECHNICAL FIELD

The invention relates generally to magnetic bearings and more particularly to a self regulating active magnetic bearing.

BACKGROUND ART

The invention has particular utility in providing radial support of a linear armature or shaft, magnetically and without physical contact, while permitting it to freely translate along its axis and/or rotate about its axis, thus eliminating frictional wear which eliminates the need for lubricants and thereby guarantees a relatively long operational life. Such apparatus is vitally necessary in applications where the equivalent becomes substantially inaccessible once put into operation.

A magnetic bearing is a device which includes a relatively stationary electromagnetic circuit which is adapted to hold a magnetizable element in suspension. An active magnetic bearing includes a displacement detector and an electronic control unit coupled thereto which forms a servosystem whereby any displacement of the suspended element as sensed by the detector is counteracted by an opposing magnetic force generated by the electromagnetic circuit in response to an output from the electronic control unit. While such apparatus is well known, it nevertheless is still subject to various physical phenomenon of non-mechanical origin such as eddy current losses, undesired phase shifts, etc., which have a deleterious effect on the operation and efficiency of the system.

STATEMENT OF THE INVENTION

Accordingly, it is an object of the invention to provide an improvement in non-frictional magnetic bearings.

Another object of the invention is to provide an improvement in active magnetic bearings where an electromagnetic circuit is adapted to hold a movable element in suspension.

Still another object of the invention is to provide a self-regulating active magnetic bearing which is adapted to hold a linear shaft in suspension.

These and other objects are achieved in a linear magnetic bearing having an elongated housing for containing a shaft type armature with quadrature positioned shaft position sensors and equidistantly positioned electromagnets located at each end of the housing. Each set of sensors is responsive to orthogonal displacement of the armature and is utilized to generate control signals to energize the electromagnets to center the armature. A bumper magnet assembly is located at one end of the housing for dampening any undesired axial movement of the armature or to axially move the armature either continuously or fixedly.

The foregoing as well as other objects, features and advantages of the invention will become more apparent from the following description taken in conjunction with the following drawings.

BRIEF DESCRIPTION OF THE DRAWINGS

FIG. 3 is a sectional view of the preferred embodiment shown in FIG. 2 taken along the lines 3—3 thereof;

FIG. 4 is a perspective view illustrative of a tapered pole piece utilized in connection with the embodiment shown in FIG. 2;

FIG. 5 is a schematic diagram helpful in understanding the operation of the subject invention;

FIG. 6 is a schematic diagram further helpful in understanding the operation of the subject invention;

FIGS. 7 and 8 are cut-away views illustrative of two other types of armature shafts adapted to be utilized by the subject invention; and FIG. 9 is an electrical schematic diagrams illustrative of the control circuitry utilized for one orthogonal axis of the embodiment shown in FIG. 2.

DETAILED DESCRIPTION OF THE INVENTION

Figure 1:
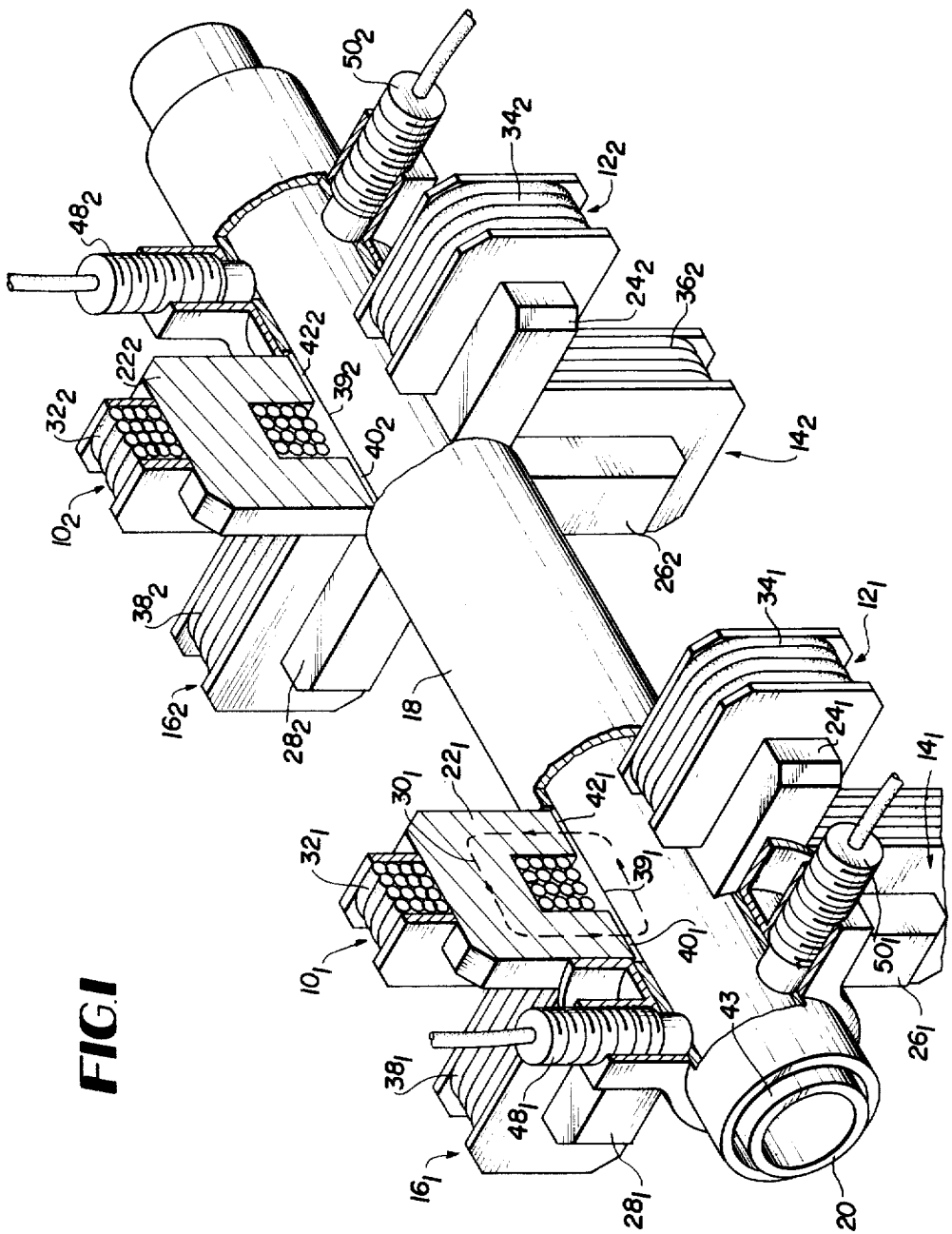
FIG. 1 is a perspective view of an embodiment generally illustrative of the subject invention.

With reference to the drawings and more particularly to FIG. 1, shown therein are two sets of four stationary electromagnets $10_1$, $12_1$, $14_1$, $16_1$ and $10_2$, $12_2$, $14_2$, $16_2$ located at each end of an elongated cylindrical housing 18 comprised of non-magnetic material which is adapted to accommodate an armature 20 in the form of a linear cylindrical shaft. The armature shaft 20 is adapted for both linear, i.e. axial, and rotational motion within the housing 18. The shaft 20 is of magnetic material at least in the vicinity of the two sets of pole pieces $22_1$, $24_1$, $26_1$, $28_1$, and $22_2$, $24_2$, $26_2$, $28_2$ and somewhat beyond, covering the extent of possible linear travel of shaft 20, so that the flux generated by respective coils $32_1$, $34_1$, $36_1$, $38_1$ and $32_2$, $34_2$, $36_2$, $38_2$ are circulated through two housing wall sections $39_1$ and $39_2$, respectively, in a closed path 30 through two series air gaps $40_1$, $42_1$ and $40_2$, $42_2$, respectively, formed between the outer surface 43 of the shaft 20 and the pole piece faces $44_1$, $46_1$ and $44_2$, $46_2$. A magnetic attraction force is developed by each of the electromagnets in the respective pole pieces by applying a unidirectional (DC) current to the coils $32_1$, $34_1$ ... $36_2$, $38_2$. In this manner, attractive forces acting in four quadrants are developed at each end of the housing 18 which are exerted upon the shaft 20. In a balanced condition, the shaft 20 will be axially suspended along the central longitudinal axis of the housing 18.

The system shown in FIG. 1 is an active system in that positional information with respect to axial alignment of the shaft 20 is provided to excite opposing pairs of coils, e.g. $32_1$ and $36_1$, by means of one of four like feedback control loops, to be described with reference to FIG. 9. The positional information at each end of the housing 18 is provided by two pairs of sensor devices which include transducers $48_1$, $50_1$ and $48_2$, $50_2$. These transducers are placed at right angles to one another, aligned with and adjacent to respective electromagnets $10_1$, $12_1$ and $10_2$, $12_2$. The transducers may consist of eddy current sensor devices which include a probe tip, not shown, which extends into the interior of the housing 18 in close proximity to the outer surface 43 of the armature shaft 20. This type of sensor device is of a conventional design and comprises one component of a known eddy current sensor system, a typical example of which is a Probe Tip Model No. 300 marketed by the Bently Nevada Corporation. When desirable, capacitive type sensors may be employed. Position sensor $48_1$, for example, is adapted to operate in conjunction with the electromagnets $10_1$ and $14_1$ which lie along one rectilinear axis whereas position sensor $50_1$ operates in connection with electromagnets $12_1$ and $16_1$, which lie along an axis perpendicular to the first axis.

Figure 2:
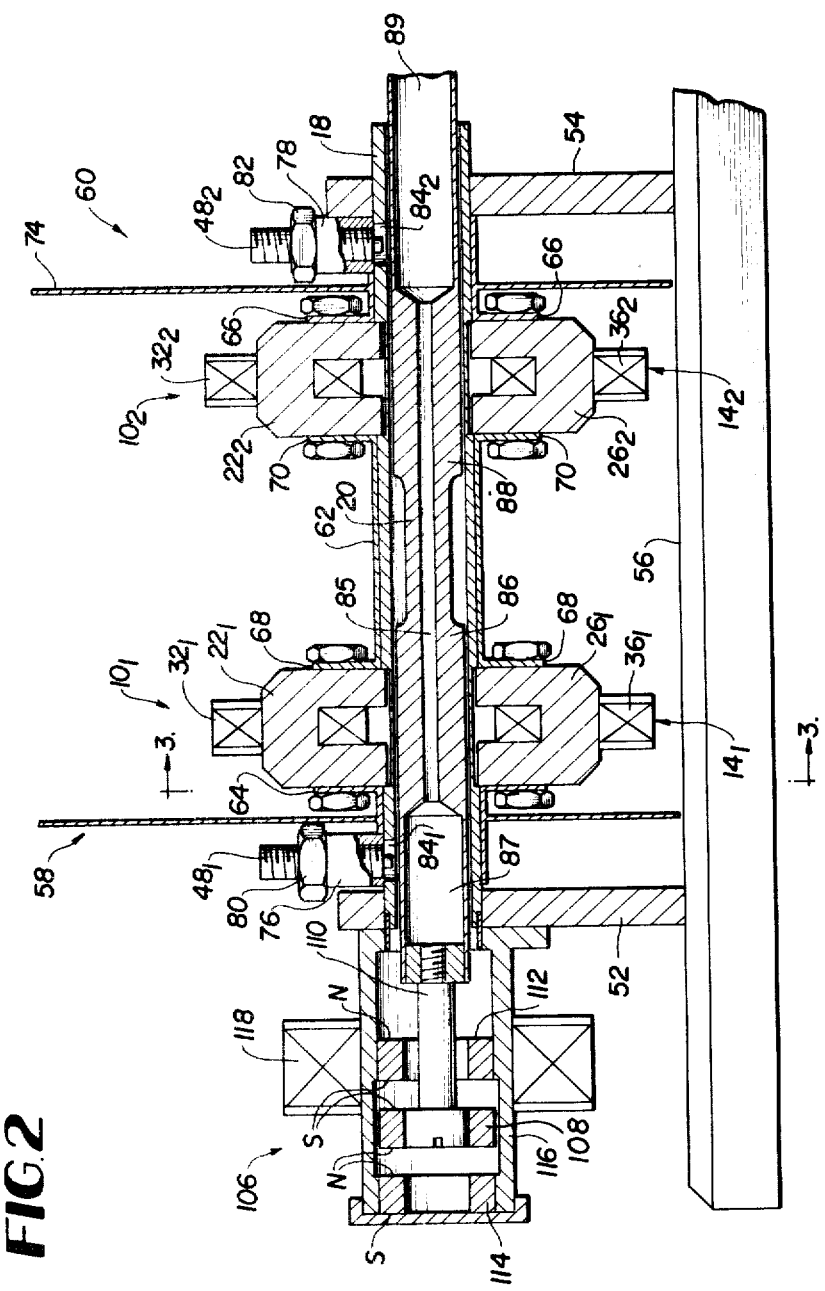
FIG. 2 is a longitudinal central cross sectional view of the preferred embodiment of the subject invention.

Referring now to FIGS. 2 and 3, there is disclosed the details of a preferred embodiment of the invention which incorporates the features of FIG. 1. In FIG. 2, the housing 18 is shown in cross section mounted between two support pedestals 52 and 54 which are secured to the base plate member 56. The two sets of electromagnets $10_1$, $10_2$, etc. are mounted on the housing 18 by two tubular type outer flange members 58 and 60, respectively, and a central flange member 62 which is also tubular in shape. The respective flange members include right angled circular flange sections 64, 66, 68 and 70 which are adapted to accept threaded hardware for securing the respective pole pieces thereto. The outer flange members 58 and 60 are securely fastened to the housing 18 and additionally include respective outwardly extending shield plates 72 and 74 which shield the position transducers $48_1$, $50_1$ and $48_2$, $50_2$ from the respective electromagnets which are located on the other side thereof.

As to the two sets of position transducers $48_1$, $50_1$ and $48_2$, $50_2$ at each end of the housing, they are mounted in respective relatively small radially outwardly projecting mounting flange portions 76 and 78 which are integral with the end flanges 58 and 60. Each transducer $48_1$, $48_2$, etc. includes a threaded outer wall which is adapted to engage and be held in place by nuts 80, 82 which also provide for positioning the tip of the transducers $48_1$ and $48_2$ within the holes $84_1$ and $84_2$ provided in the wall of the housing 18. The same structure is utilized for the orthogonally positioned transducers $50_1$ and $50_2$ shown in FIG. 1.

The armature shaft 20 includes enlarged cross sectional portions 86 and 88 in the region of the pole pieces $22_1$, $26_1$ and $22_2$, $26_2$, respectively. The armature shaft 20, moreover, is comprised of magnetically permeable material throughout and accordingly the enlarged portions 86 and 88 provide a close magnetic coupling to the surrounding pole pieces. The cross sectional area of the shaft portions 86 and 88 is also made sufficiently large so that they will not saturate; otherwise, a substantial amount of coil ampere turns would be required for the passage of the armature flux. Accordingly, the shaft material is typically comprised of cold rolled steel because it has a relatively high magnetic saturation level and, as such, a relatively small diameter shaft can pass a large amount of flux. Its relatively low permeability also gives a larger AC skin depth for AC flux penetration than, for example, pure iron.

While the orthogonality of the electromagnets is shown in FIG. 1, this aspect is further illustrated in FIG. 3 where electromagnetics $10_1$ and $14_1$ are shown opposing one another along the vertical axis while electromagnets $12_1$ and $16_1$ oppose one another along the horizontal axis. FIG. 3 also illustrates the central longitudinal alignment of the shaft portion 86 within the housing 18 when suspended as well as the general shape of the pole pieces $22_1$, $24_1$, $26_1$ and $28_1$, and their respective windings $32_1$, $34_1$, $36_1$ and $38_1$.

As to the pole pieces themselves, they are all identical in construction. One illustrative pole piece $22_1$ is shown in perspective view in FIG. 4. The pole piece $22_1$ is a generally U-shaped, bifurcated member including leg portions 90 and 92 separated by a bight portion 93. The leg portions 90 and 92 are tapered downwardly toward concave pole faces 94 and 96, respectively, which have a radius just slightly larger than the inner surface of the housing 18. The tapering of the pole piece leg portions 90 and 92 provides a concentration of the flux whereas the curved pole faces 94 and 96 provide a constant air gap between the pole piece and the suspended shaft 40 and 42 as shown in FIGS. 1 and 3. While flux leakage occurs, the pole piece mid-section or bight portion 93, which accommodates a coil, not shown, is relatively thick in the region 98 to avoid saturation and allow the flux to pass at a low flux density level through the pole faces 94 and 96 to the armature shaft 20. The tapered pole piece also serves to increase the magnetic suspension force of the bearing inasmuch as the suspension force is proportional to the square of the flux divided by the gap cross sectional area. Accordingly, the smaller the cross sectional area of the gap, the greater the attractive force. The pole pieces need not be tapered, however, to work effectively.

While the armature shaft 20, shown in the preferred embodiment of FIG. 2, is comprised of a unitary member, it nevertheless includes a small diameter axial bore 85 which terminates in enlarged diameter end bore portions 87 and 89 which exist in the region of the position transducers $48_1$, $50_1$ and $48_2$, $50_2$, respectively. The purpose of the bore portions 85, 87 and 89 is to reduce the weight of the suspended shaft as much as possible. Accordingly, the diameter of the shaft 20 is further reduced in the intermediate region 91 shown in FIG. 2.

Alternative configurations of the armature shaft 20 are shown in FIGS. 7 and 8. In FIG. 7 a relatively small diameter shaft member 20', which may be hollow, for example, includes a pair of magnetic sleeve members 98 and 100 fitted on the outer surface of the shaft in the region of the electromagnets, not shown, and somewhat beyond, to allow for effective support of the shaft throughout its distance of linear travel. In such an arrangement, the shaft 20' need not be comprised of magnetic material but may consist of lightweight nonmagnetic material, such as plastic. Alternatively, another configuration of the armature shaft comprises the configuration shown in FIG. 8 wherein reference numeral 20" denotes a relatively thin hollow tubular shaft consisting of magnetic material within which is placed a pair of internal sleeve members 102 and 104, also comprised of magnetic material. In both cases the region of the location of the electromagnets in the respective air gaps is enlarged so that magnetic saturation does not occur with the design of the particular magnetic circuit utilized.

In order to provide an understanding of the operation of the active magnetic bearing as disclosed in FIGS. 1 and 2, reference will now be made to FIGS. 5 and 6 which respectively provide a side planar and end view of a schematic representation of the invention. As shown in FIG. 6, the armature shaft 20 is centrally located between the pole pieces $22_1$, $24_1$, $26_1$ and $28_1$. As shown in FIG. 5, flux paths $30_1$ and $30_2$, respectively, cross the air gaps $40_1$, $42_1$ and $40_2$, $42_2$ to the surface of the armature shaft 20 whereupon a magnetic attraction force is developed by each individual pole piece when a DC current is applied to the respective coils. By operating mutually opposing pairs of coils concurrently, quadrant forces are developed along orthogonal X and Y axes to maintain the armature shaft 20 in suspension. Any external force which might be imposed on shaft 20, such as a force F applied at an angle $\theta$ with respect to the Y axis, as shown in FIG. 6, will produce two orthogonal component forces directed along the X and Y axes which tend to displace the shaft away from the central longitudinal axis. Accordingly, it can be seen that to realign the shaft, excitation of the coils energizing the pole pieces $24_1$ and $26_1$ would be required in order to bring the shaft back into alignment. Also because two sets of electromagnets are separated by a distance L, the applied force F produces a cantilever effect on the shaft 20 which results in different forces being applied about the respective X-Y axis at the location of the two sets of electromagnets. Therefore, counter moments must be separately created by the eight pole pieces which also results in the bearing having an enhanced torsional stability and moment carrying capability.

The advantage in using four equally spaced pole pieces is that cross coupling of the pole piece forces is substantially absent due to the orthogonality of the arrangement. Consequently, each coil can be energized in response to shaft position information derived by one of the transducers $48_1$, $50_1$ or $48_2$, $50_2$ which are also located along the X-Y axes. While a minimum number of electromagnets required to constrain a shaft is three, a three pole configuration requires complex signal processing to direct current through the appropriate suspension coils. A four pole configuration therefore provides a simpler approach because coil excitation signals for only two axes (X and Y) are required.

Prior to considering the electronic circuitry utilized for implementing the servo type control system which operates to excite the required electromagnetic coils to counteract any forces acting on the armature shaft 20, reference will again be made briefly to the embodiment shown in FIG. 2 wherein there is shown an axially magnetized bumper magnet assembly 106. Included therein is an axially magnetized permanent magnet 108 which is secured to a shaft 110 attached to one end of the shaft 20. The shaft 110 extends through one of a pair of stationary axially magnetized permanent magnets 112 and 114 which are held in place by a cylindrical housing 116 attached to the pedestal 52. The magnet 108 is poled to be repulsed by both of the stationary magnets 112 and 114 so that it is adapted to float therebetween. As a result, any undesired lateral, i.e. axial, displacement of the armature shaft 20 will be acted on by a restoring force developed by the assembly 106. In the event that an oscillatory or reciprocal movement of the shaft 20 in a linear direction is required, a coil 118 is provided around the housing 116 which is excited by an AC current. Upon the application of an AC current to the coil 118, an axial magnetic field will be applied to the bumper magnet 108 which will oscillate back and forth between the fixed magnets 112 and 114. Because it is attached to the armature shaft 20 by means of the rod 110, an oscillatory movement will be imparted to the shaft. The application of a D.C. voltage to coil 118 will result in the shaft achieving a fixed axial position while shorting the coil will result in magnet 108 operating as a "bumper" preventing the contact of magnet 108 with magnet 114.

Considering now the electrical control portion of the subject invention, in order to develop the necessary counteracting magnetic attractive forces required to maintain the armature shaft in alignment, four substantially identical circuit configurations, one of which is shown in FIG. 9, is utilized for energizing the four pairs of mutually opposing windings along the horizontal (X) and vertical (Y) axes at both ends of the housing 18. The circuit configuration shown in FIG. 9 is typically illustrative of the circuit utilized for implementing a closed loop feedback circuit for energizing the opposing windings $32_1$ and $36_1$ along the vertical or Y axis in response to positional information of the shaft sensed by the transducer $48_1$.

As shown in FIG. 9, the transducer $48_1$ forms one element of an eddy current sensor system 120 which, for example, may be a Proximeter Model No. 3000 manufactured by the Bently Nevada Corporation. Additionally, the sensor system 120 includes an RF coil, not shown, located on the forward tip 82 of the transducer $48_1$ which is placed adjacent the armature shaft 20 as shown in FIG. 2. The RF coil is excited with a nominal frequency of, for example, 2 MHz from a circuit module 122 including an oscillator circuit, not shown. The coil in the tip 82 radiates a localized magnetic field pattern which produces eddy currents in the surface layer of the armature shaft 20 which "loads down" the RF coil. A resonant circuit in the circuit module 122 changes its amplitude in response to the loading, whereupon an output signal appearing on lead 124 changes correspondingly. As the sensed surface of the armature shaft is moved closer to the probe tip 82, coupling of the radiated field increases and therefore the loss in RF coil loading increases, causing the output voltage from the circuit module 122 to change. A cable 126 couples the transducer $48_1$ to the circuit module 122. Inasmuch as the cable 126 has a specified capacitance per unit length, it interacts with the resonant circuit elements inside the circuit module 122 and accordingly affects the nominal resonant frequency, which by varying the lengths of cable, the carrier frequency exciting the RF coil can be changed. Interference can occur between the various transducers 48 and 50 at each end of the housing 18 because the suspended armature shaft 20 acts like a coaxial transmission line. To overcome this effect, the respective transducer carrier frequencies are preferably offset by predetermined amounts by the selection of different cable lengths.

The sensor output signal which appears on circuit lead 124 is split into two circuit paths. One circuit path connects to a position comparator circuit 126 which includes an operational amplifier having one input (−) coupled to the sensor signal, while the other input (+) is coupled to a variable DC reference signal provided by a potentiometer 130 coupled across a fixed DC voltage source, not shown. The operational amplifier 128 provides a difference signal output between the existing and desired positional inputs and thus generates an error signal which is directly proportional to the displacement of the armature shaft 20 from its central or axial position within the housing 18. The output signal from the operational amplifier 128, moreover, is positive for displacement of the armature shaft 20 in one direction while it is negative if the displacement is in the opposite direction. The other circuit path is coupled to a differentiator circuit 132 which includes a resistive-capacitive network 133 coupled to one input (−) of an operational amplifier 134 whose other input (+) is grounded. The output of the operational amplifier 134 accordingly comprises a signal which is proportional to velocity or rate of change of displacement of the armature shaft 20 from its desired position. The velocity signal is applied to one input (−) of an operational amplifier 136 whose output comprises one input to a summing circuit 138 which includes a resistive summing network 137 and an operational amplifier 139. The other input to the summing circuit is the position signal from the comparator circuit. The gain in the one or position channel determines the stiffness of the bearing while the gain in the other or velocity channel determines the dampening of the bearing. The gains in the respective position and velocity channels are determined by the component values associated with the various operational amplifiers and thus the output of operational amplifier 139 comprises a composite control signal which provides a suitable signal for properly energizing a pair of coils $32_1$ and $36_1$.

Ideally, the forces acting on the armature shaft 20 are in phase with the output of the summing amplifier 139; however, two factors cause deviation from the ideal. First, eddy currents in the armature shaft 20 and in the core material of the pole pieces $22_1$ and $26_1$ associated with the windings $32_1$ and $36_1$ cause a phase shift between the current energizing the respective windings and the magnetic flux produced thereby. A phase corrector circuit 140 including a parallel resistive capacitive network 142 and two operational amplifiers 144 and 146 are therefore included in the circuitry shown in FIG. 9 to partially correct this deviation. The second phase shift is caused by the inductance of the coils $32_1$ and $36_1$ which causes the current flowing therein to lag the voltage applied across them during excitation. This second deviation is overcome by a current feedback signal developed across a series resistor 148 coupled to like ends of the coil windings $32_1$ and $36_1$. This signal is fed back to one input (−) of a driver amplifier circuit 150 including the operational amplifier 152 whose other input (+) is connected to the output of operational amplifier 146. The driver amplifier 150 also includes a voltage feedback provided by a resistor 154 coupled between the output and the negative (−) input of the operational amplifier 152 to limit the voltage gain of the driver amplifier circuit 150 in order to insure stability of the current feedback.

The output of the operational amplifier 152 comprises a signal current which is channeled to the pair of Y axis electromagnet coils $32_1$ and $36_1$ by the diodes 156 and 158 which are oppositely poled with respect to one another so that the positive output from the driver circuit 150 causes coil $32_1$ to be energized thereby attracting the armature 20 upwardly along the Y axis while a negative output therefrom energizes the coil $36_1$ which causes a downward attraction of the armature 20 on the Y axis. Thus, depending upon any deviation from its aligned position along the Y axis, the electromagnets $10_1$ and $14_1$ will be properly energized to drive the shaft 20 in the proper direction until a zero error signal is produced at the output of the comparator circuit 126.

Having thus shown and described what is at present considered to be the preferred embodiment of the subject invention, all modifications, changes and alterations coming within the spirit and scope of the invention as defined in the appended claims are herein meant to be included.

We claim:

1. An active magnetic bearing for supporting a linear member (20) which is magnetic at least in the region (86) of being supported, comprising the combination of:
    elongated housing means (18) having at least one nonmagnetic region ($39_1$) along its length located in the vicinity of said linear member (20) which includes said region (86) of being supported;
    at least one set of stationary electromagnets ($10_1$, $12_1$, $14_1$, $16_1$) equidistantly positioned around said housing means (18) at said nonmagnetic region ($39_1$), each electromagnet being comprised of a coil winding ($32_1$, $34_1$, $36_1$, $38_1$) wound on a bifurcated pole piece ($22_1$, $24_1$, $26_1$, $28_1$) having an optionally tapered region (90 and 92) adjoining each pole face of a pair of pole faces (94 and 96), said pole faces having a contour substantially corresponding to the cross sectional configuration of said housing means (18) and directed inwardly towards said linear member (20) to provide a localized magnetic field (30) of increased flux density which is coupled to said linear member to provide a suspension force for said linear member;
    position sensor means ($48_1$ and $50_1$) selectively positioned on said housing means (18) adjacent said set of electromagnets and being operable to detect any displacement of said linear member (20) from a predetermined position within said housing means (18) and providing an output indicative of said displacement; and
    drive circuit means (126, 132, 138, 140, 150), coupled to said position sensor means ($48_1$ and $50_1$) and being responsive to said output therefrom to provide a control signal, said control signal being coupled to predetermined coil windings ($32_1$, $36_1$ and $34_1$, $38_1$) of said set of electromagnets for selective energization thereof to center said linear member at said nonmagnetic region.

2. The magnetic bearing as defined by claim 1 wherein said set of stationary electromagnets ($10_1$, $12_1$, $14_1$, $16_1$) comprises a set of four electromagnets equidistantly positioned around said housing means (18) such that two electromagnets ($10_1$, $14_1$ and $12_1$, $16_1$) each comprise mutually opposing pairs of electromagnets on opposite sides of said housing means (18) and respectively located along a common axis of two orthogonal axes (X, Y),
    wherein said position sensor means comprises two sensor means ($48_1$ and $50_1$) each of which is aligned with a respective axis (X and Y) of said orthogonal axes, and
    wherein said drive circuit means comprises first and second drive circuits (126, 132, 138, 140, 150) respectively coupled to said sensor means ($48_1$ and $50_1$) and operative to drive respective coil windings ($32_1$, $36_1$ and $34_1$, $38_1$) of said pairs of electromagnets ($10_1$, $14_1$ and $12_1$, $16_1$).

3. The magnetic bearing as defined by claim 1 wherein said housing means includes another nonmagnetic region ($39_2$) in spaced apart relationship with said at least one nonmagnetic region ($39_1$), and additionally including:
    a second set of stationary electromagnets ($10_2$, $12_2$, $14_2$, $16_2$) equidistantly positioned around said housing means (18) at said another nonmagnetic region ($39_2$), each electromagnet of said second set also being comprised of a coil winding ($32_2$, $34_2$, $36_2$, $38_2$) wound on a bifurcated pole piece ($22_2$, $24_2$, $26_2$, $28_2$) having a tapered region (90 and 92) adjoining each pole face of a pair of pole faces (94 and 96), said pole faces having a contour corresponding to the cross sectional configuration of said housing means and directed inwardly towards said linear member to provide a localized field (30) as aforesaid;

second position sensor means ($48_2$ and $50_2$) selectively positioned on said housing means (18) adjacent said second set of electromagnets ($10_2$, $12_2$, $14_2$, $16_2$) and being operable to detect any displacement of said linear member (20) from a predetermined position in said housing means (18) at said another nonmagnetic region ($39_2$) and providing a respective output indicative of said displacement thereat; and second drive circuit means (126, 132, 138, 140, 150) coupled to said second sensor means and being responsive to said output therefrom to provide another control signal, said another control signal being coupled to predetermined coil windings ($32_2$, $36_2$ and $34_2$, $38_2$) of said second set of electromagnets ($10_2$, $12_2$, $14_2$, $16_2$) for selective energization thereof to center said linear member at said another nonmagnetic region ($39_2$).

4. The magnetic bearing as defined by claim 3 wherein both sets of electromagnets ($10_1$, $12_1$ ... $14_2$, $16_2$) are mounted in mutually opposing pairs ($10_1$, $14_1$ ... $12_2$, $16_2$) around said housing means (18) along two mutually perpendicular axes (X, Y) transversely through said housing means at said nonmagnetic regions ($39_1$ and $39_2$), wherein both sets of position sensor means ($48_1$, $50_1$ and $48_2$, $50_2$) include a respective pair of position transducers substantially aligned with said electromagnets ($10_1$, $12_1$ and $10_2$, $12_2$) so as to detect any displacement of said linear member from said predetermined position along said axes (X and Y), and wherein both said drive circuit means comprises pairs of drive circuits (126, 134, 138, 140, 150) coupled to respective pairs of position transducers ($48_1$, $50_1$ and $48_2$, $50_2$) for energizing respective pairs of electromagnets ($10_1$, $14_1$ ... $12_2$, $16_2$) which are thereby adapted to position said linear member along said perpendicular axes (X, Y) at both said nonmagnetic regions ($39_1$ and $39_2$) of said housing means.

5. The magnetic bearing as defined by claim 4 wherein said elongated housing means (18) is generally cylindrical in shape.

6. The magnetic bearing as defined by claim 4 wherein said housing means (18) is generally circular in cross section and wherein said linear member (20) comprises an elongated armature shaft having a generally rounded outer surface (43) at least in the proximity of said nonmagnetic regions ($39_1$ and $39_2$) of said housing means.

7. The magnetic bearing as defined by claim 6 wherein said bifurcated pole pieces ($22_1$, $24_1$ ... $26_2$, $28_2$) have generally concave pole faces (94, 96) substantially matching the rounded outer surface (43) of said armature shaft (20).

8. The magnetic bearing as defined by claim 5 wherein said linear member (20) comprises a shaft generally cylindrical in shape (43) in the region of said generally cylindrical housing (18).

9. The magnetic bearing as defined by claim 5 wherein said linear member (20) comprises a shaft having a cross section including a region (86, 88) of magnetic material coincident with said region ($96_1$, $96_2$) of being supported.

10. The magnetic bearing as defined by claim 5 wherein said linear member (20) comprises an elongated shaft having an annular cross section of varying dimensions (86, 88) along its length and wherein the cross sectional area is greater in said region of being supported at said nonmagnetic regions ($96_1$, $96_2$) of said housing means (18).

11. The magnetic bearing as defined by claim 5 wherein said linear member (20) comprises a shaft (20') having a sleeve (98, 100) of magnetic material located in said regions of being supported at said nonmagnetic regions ($96_1$, $96_2$) of said housing means (18).

12. The magnetic bearing as defined by claim 5 wherein said linear member (20) comprises a shaft (20") of nonmagnetic material including an axial bore within which is located respective magnetic bodies (102 and 104) situated at the region of being supported at said nonmagnetic regions ($96_1$, $96_2$) of said housing means (18).

13. The magnetic bearing as defined by claim 4 and additionally including magnetic shield means (72 and 74) located intermediate said electromagnets ($10_1$, $12_1$ ... $14_2$, $16_2$) and said position sensor means ($48_1$ ... $50_2$)

14. The magnetic bearing as defined by claim 4 and additionally including flange means (58 and 60) located on the exterior of said housing means (18) for attaching said electromagnets thereto, and wherein said flange means include radially extending shield members (72 and 74) located intermediate said electromagnets ($10_1$, $12_1$ ... $14_2$, $16_2$) and said position sensor means ($48_1$ ... $50_2$).

15. The magnetic bearing as defined by claim 4 wherein said position sensor means ($48_1$ ... $50_2$) comprises eddy current sensor means.

16. The magnetic bearing as defined by claim 1 wherein said drive circuit means (126, 132, 138, 140, 150) includes means providing respective signals proportional to displacement and velocity of said linear member from a central position in said housing means (18) from which is generated a composite control signal of a predetermined gain for providing a desired bearing stiffness and dampening characteristic.

17. The magnetic bearing as defined by claim 1 and additionally including means (106) connected to said linear member (20) for dampening undesired axial displacement thereof.

18. The magnetic bearing as defined by claim 17 wherein said dampening means (106) comprises a bumper magnet assembly including a magnet (108), coupled to said linear member (20), located adjacent at least one stationary magnet (112) and being poled to be repulsed thereby.

19. The magnetic bearing as defined by claim 17 wherein said dampening means (106) comprises a bumper magnet assembly including a magnet (108) coupled to one end of said linear member (20), located intermediate a pair of stationary magnets (112 and 114), said magnets being poled so that the intermediate magnet is repulsed by both stationary magnets.

20. The magnetic bearing as defined by claim 19 wherein the magnets (108, 112 and 114) are comprised of axially magnetized magnets.

21. The magnetic bearing as defined by claim 20 wherein said axially magnetized magnets (108, 112 and 114) are permanent magnets and additionally including means (118) located in proximity to said intermediate magnet (108) for applying an AC axial magnetic field thereto thereby causing said intermediate magnet (108) to oscillate between said pair of stationary magnets (112 and 114).

22. The magnetic bearing as defined by claim 21 wherein said permanent magnets (108, 112 and 114) are located in a housing (116) adjacent said elongated housing means (18) and wherein said means for applying said AC magnetic field comprises a coil (118) located around said housing (116).

23. The magnetic bearing as defined by claim 19 wherein one of said stationary magnets (112) includes an aperture, and additionally including a connecting link (110) passing through said aperture connecting said intermediate magnet (108) to said linear member (20).

* * * * *